United States Patent [19]

Miyajima

[11] Patent Number: 4,766,729
[45] Date of Patent: Aug. 30, 1988

[54] APPARATUS FOR TRANSMITTING POWER OBTAINED BY CONVERTING THE EXHAUST ENERGY OF AN ENGINE

[75] Inventor: Hidenobu Miyajima, Fukuroi, Japan

[73] Assignee: Asahi Malleable Iron Co., Ltd., Japan

[21] Appl. No.: 78,020

[22] Filed: Jul. 24, 1987

Related U.S. Application Data

[63] Continuation of Ser. No. 710,052, Mar. 11, 1985, abandoned.

[30] Foreign Application Priority Data

Apr. 3, 1984 [JP] Japan .................................. 59-67230

[51] Int. Cl.⁴ ............................................ F02B 33/36
[52] U.S. Cl. .................................... 60/598; 123/559.1
[58] Field of Search ......................... 60/609, 610, 598; 123/559

[56] References Cited

U.S. PATENT DOCUMENTS 3,727,399  4/1973  Brille et al. ..................... 60/609 X

FOREIGN PATENT DOCUMENTS 51221  3/1983  Japan ................................. 123/559

Primary Examiner—Michael Koczo
Attorney, Agent, or Firm—Darby & Darby

[57] ABSTRACT

An apparatus for transmitting power obtained by converting the exhaust energy of an engine. An exhaust port is connected to an output turbine via a turbine intake port. The turbine drives an output shaft via a fluid compressor, which in turn is connected via an outlet port to an intake port of a rotary piston type expansion engine having an eccentrically rotating triangle shaped rotor with a double jointed trochoidal shaped rotor housing.

2 Claims, 3 Drawing Sheets

FIG. I (PRIOR ART)

APPARATUS FOR TRANSMITTING POWER OBTAINED BY CONVERTING THE EXHAUST ENERGY OF AN ENGINE

This is a continuation of co-pending application Ser. No. 710,052 filed on Mar. 11, 1985, now abandoned.

BACKGROUND OF THE INVENTION

This invention relates to a power transmitting method and its apparatus, and more particularly to a method and apparatus for effectively transmitting power obtained by converting exhaust energy of an engine.

In general, a method and apparatus for transmitting power obtained by converting the exhaust energy of an engine is, as shown in FIG. 1, constituted as such that an exhaust passage 3 connected to an exhaust port of an engine 1 is connected to a turbine intake port 5 of an output turbine 4. On an output shaft 6 of said output turbine 4, an output gear 7 is mounted, and several reduction gears 8 are meshed with said output gear 7. The final row of the reduction gears 8 are meshed with a crank shaft gear 10 mounted on a crank shaft 9 of the engine 1. The function of the prior art is such that exhaust gas generated in the engine 1 is introduced to the turbine intake port 5 from the exhaust port 2 to drive the output turbine 4, and power generated in the output turbine 4 is transmitted to the output gear 7, and to the several reduction gears 8 and then to the crank shaft gear 10 from the output turbine 4 through the output shaft 6.

Accordingly, in the conventional method and apparatus for transmitting the power of exhaust energy, the rotary energy generated by the output turbine is transmitted through the reduction gears. Therefore, there exist limitations in the power transmitting distance and the portions where such power can be used. In this way, the range of its use is quite limited.

The present invention was accomplished in order to solve the above disadvantages inherent to the prior art.

SUMMARY OF THE INVENTION

It is therefore an object of the present invention to provide a power transmitting method which can easily transmit the power to a position where it is required.

Another object of the invention is to provide a power transmitting method which can be handle easily.

A further object of the present invention is to provide a power transmitting apparatus which can be used as an auxiliary power of an engine.

A still further object of the present invention is to provide a power transmitting apparatus which can be used as a charger.

An even further object of the present invention is to provide a power transmitting apparatus which can increase the discharge efficiency of the engine.

In order to obtain the above objects and others, there is essentially provided a power transmitting method of exhaust energy characterized in that a fluid compressor is driven by exhaust energy of an engine and a compressed fluid obtained by said fluid compressor is acted on an expansion engine.

There is also provided a power transmitting apparatus characterized in that an output turbine is provided in an exhaust passage of an engine, a fluid compressor is mounted on an output shaft of said output turbine, and an outlet port of said fluid compressor is connected to an intake port of a rotary piston type expansion engine eccentrically rotating a generally regular triangle shaped rotor within a double jointed trochoidal shaped rotor housing.

BRIEF DESCRIPTION OF THE DRAWINGS

The novel features and advantages of the present invention will become more apparent from the following specification and claims when read together with the accompanying drawings wherein:

DETAILED DESCRIPTION OF THE EMBODIMENT

Figure 1:
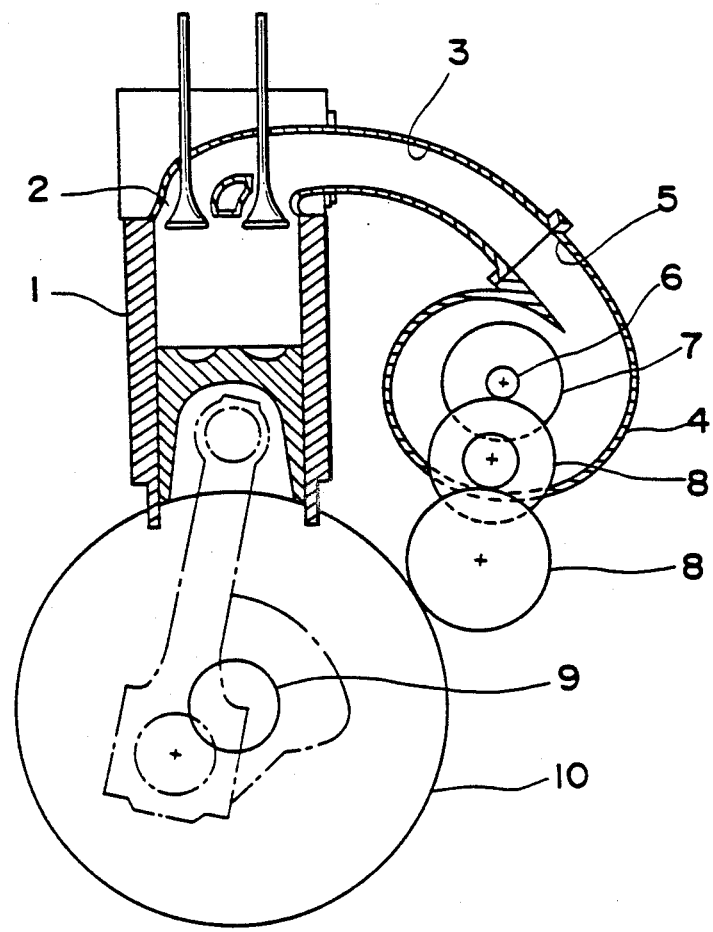
FIG. 1 is a schematic view of a conventional power transmitting method and apparatus.
Figure 2:
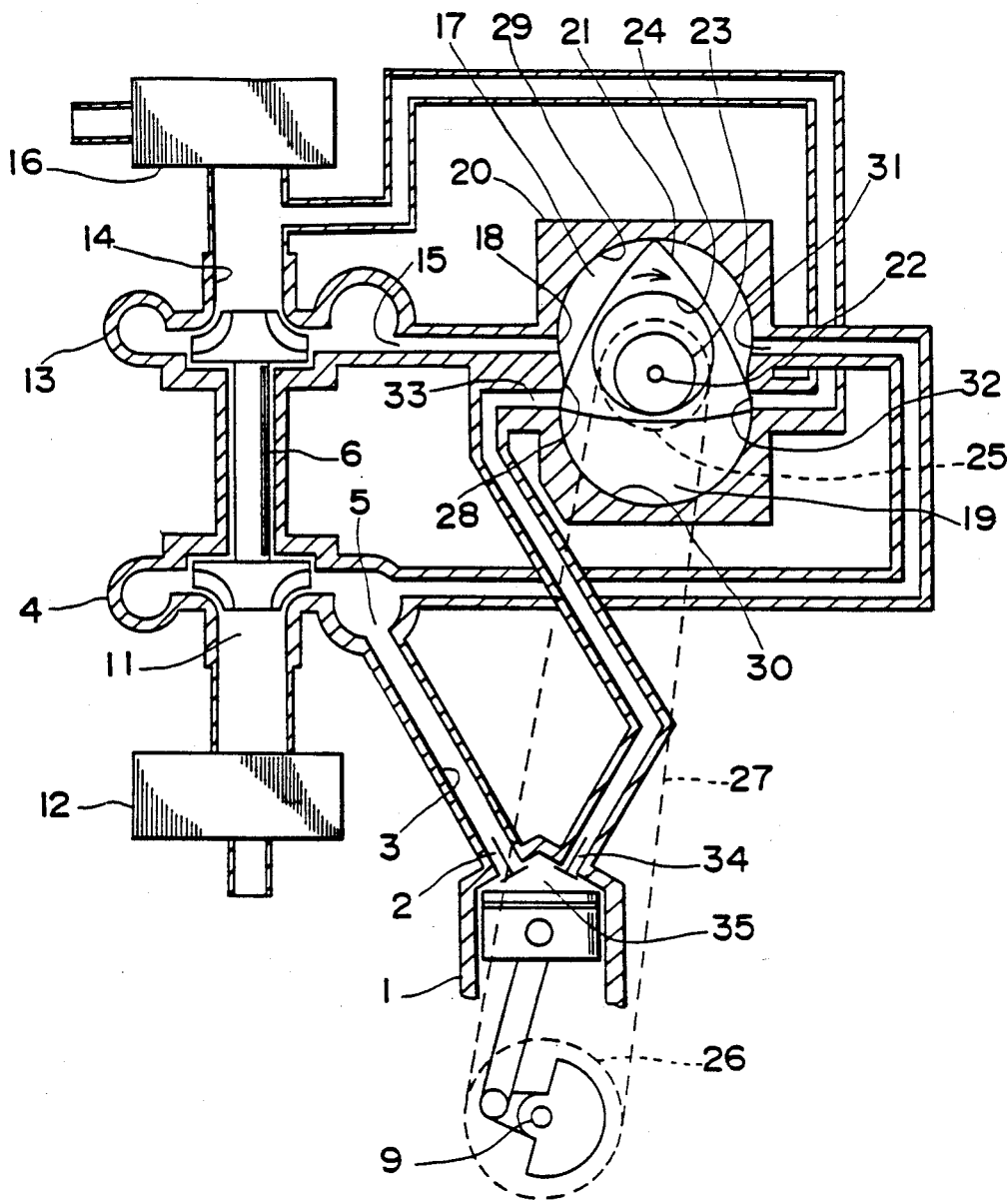
FIG. 2 is a schematic view of a power transmitting method and apparatus according to the present invention.

One preferred embodiment of the present invention will be described with reference to FIG. 2.

An exhaust passage 3 connected at one end to an exhaust port 2 of an engine 1 is connected at the other end to a turbine intake port 5 of an output turbine 4. A outlet port 11 of said output turbine 4 is connected to a muffler 12. On an output shaft 6 fixedly secured to said output turbine 4, a centrifugal compressor 13 is mounted. A turbo intake port 14 and a turbo outlet port 15, respectively, are connected to an air cleaner 16 and an expansion chamber intake port 18 of an expansion engine 17.

Said expansion engine 17 is coaxially associated with a compression engine 19 and is a rotary piston type engine. The structure of said expansion engine 17 is such that a generally regular triangle shaped rotor 21 is disposed within a double jointed trochoidal shaped rotor housing 20. Said rotor 21 includes bearings (not shown) revolving about the axis of said rotor 21 therein. Said bearing is rotatably fitted with an eccentric shaft 22 which rotates about a rotary axis eccentric with respect to rotary axis of said bearing and axially supported by a side wall (not shown) of said rotor housing 20. Within said side wall, a guide gear 23 is fixedly secured in a concentric manner with respect to the rotary axis of said eccentric shaft 22. Said guide gear 23 is provided with a rotor gear 24 disposed at the inner end portion of said rotor 21. At an end portion of said eccentric shaft 22, a rotor side pulley 25 is fixedly secured. Said rotor side pulley 25 is cooperatively associated with an engine side pulley 26 fixedly secured to the crank shaft 9 of said engine 1 through a belt 27. Within said rotor housing 20, an expansion chamber 29 and a compression chamber 30 are formed opposite relative to each other by serving a twisted portion 28 as a border therebetween. These respective chambers 29 and 30 are formed at the expansion chamber 29 side with the expansion chamber intake port 18 and the expansion chamber outlet port 31 opposite with respect to each other within said rotor housing 20, and at the compression chamber 30 side with a compression chamber intake port 32 and a compression chamber outlet port 33 opposite with respect to each other within said rotor housing 20. Said turbo outlet port 15 is connected to the expansion chamber intake port 18 and said expansion chamber outlet port 31 is connected to said turbine intake port 5. Said compression intake port 32 is connected to said air cleaner 16. Said compression chamber outlet port 33 is connected to the intake port 34 of said engine 1 and communicating with a combustion chamber 35.

Next, the function of the present invention will be described. The description which follows relates to when the engine is rotated at low speed.

A part of the output obtained by driving the engine 1 rotates the rotor side pulley 25 through the crank shaft 9, the engine side pulley 26 and the belt 27 to drive said rotor 21. At the same time, the air is introduced into said compression chamber 30 through the air cleaner 16. Such introduced air is compressed by about a half rotation of said rotor 21. The compressed air is charged into the combustion chamber 35 of the engine 1 from the intake port 34 together with fuel. The description which follows relates to when the engine is rotated at high speed.

Exhaust gas generated in the engine 1 is introduced to the turbine intake port 5 passing through the exhaust passage 3 from the exhaust port 2 to drive the output turbine 4, and is discharged outside from the turbine outlet port 11 passing through the muffler 12. The driving of the output turbine 4 causes the centrifugal compressor 13 to be driven through the output shaft 6. As a result, the air is intaken into the turbo intake port 14 through the air cleaner 16 and discharged as a compressed air from the turbo outlet port 15, and then guided to the expansion chamber intake port 18 to rotate the rotor 21 in the direction of the arrow shown in FIG. 2. Then, it is discharged to the turbine intake port 5 from the expansion chamber discharge port 31. After assisting the driving of the output turbine 4 together with said exhaust gas, it is discharged into the muffler 12. Since the rotation of the rotor 21 causes the compression chamber 30 to be negative pressure, the air is guided to the compression chamber intake port 32 passing through the air cleaner 16, and is compressed by the rotation of the rotor 21, and then charged into the combustion chamber 35 of the engine 1 from the compression chamber outlet port 32. Furthermore, the torque of the rotor 21 generated in the expansion engine 17 is transmitted to the crank shaft 9 of the engine 1 through said rotor side pulley 25, said belt 27 and said engine side pulley 26 to assist the output of the engine 1.

As described in the foregoing, according to the power transmitting method of the present invention, the fluid compressor is driven by the exhaust energy of the engine, and the compressed fluid obtained by said fluid compressor is acted on the expansion engine. Since the invented method is to provide a method for transmitting the power of exhaust energy, contrary to the conventional method in which the rotary energy generated in the output turbine is transmitted by a number of reduction gears, the compressed fluid can be easily transmitted through, for example, a tubular member to a position where the power is required. Furthermore, by intaking the air of normal temperature to the fluid compressor, no introduction of exhaust gas of high temperature is required any more. Thus, an easy handling can be obtained.

Figure 3:
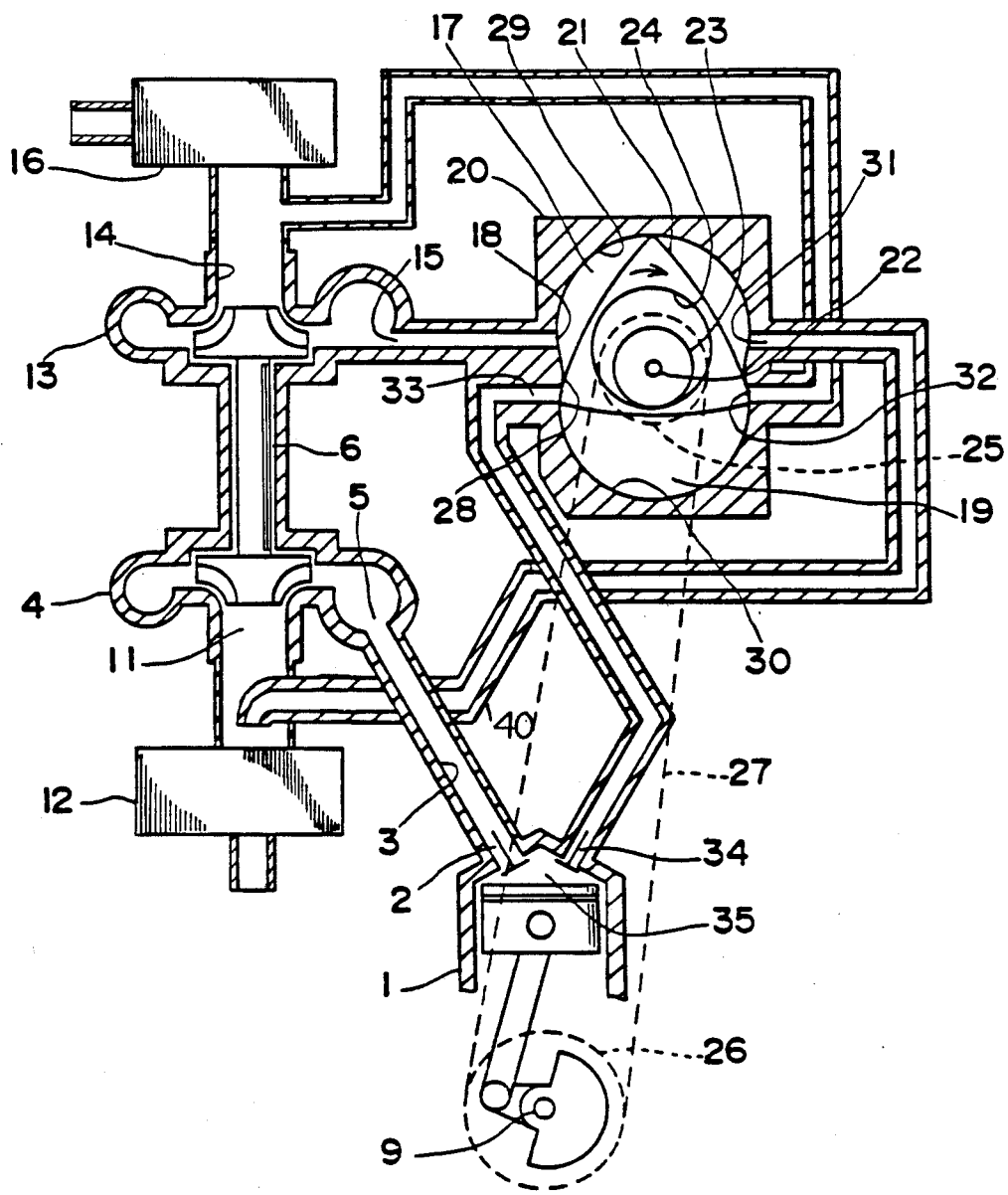
FIG. 3 is a schematic view of an alternative embodiment of the present invention.

On the other hand, the invented apparatus is a power transmitting apparatus of exhaust gas in which the outlet port of the fluid compressor is connected to the intake port of the rotary piston type expansion engine which eccentrically rotates the generally regular triangle shaped rotor within the double jointed trochoidal shaped rotor housing. The rotary piston type engine is designed as such that two works operations can be carried out by one half rotation of the rotor. Therefore, the two chambers can be used as expansion engines respectively, or alternatively one of the chambers can be used as an expansion engine and the other can be used as a compression engine. In the former case, the compressed fluid may be introduced into the two chambers, respectively. When the rotor is driven and the torque is transmitted to the crank shaft of the engine through a belt or the like, it can be used as an auxiliary power of the engine. On the other hand, in the latter case, it can be used as a charger as in the above embodiment. In this case, by introducing the fluid discharged from the expansion engine to the turbine intake port of the output turbin which cooperatively associates with said fluid compressor, it can be used as an auxiliary power for rotating the output turbine. Alternatively, the fluid may be discharged, as shown in the alternative embodiment of FIG. 3, through conduit 4D, between the turbine outlet port and the muffler in order to obtain the similar effect as the jet pump, thus enabling to increase the discharge efficiency of the engine as well.

While the present invention has been particularly shown and described in its preferred form with certain degree of particularity, it will be understood by those skilled in the art that the foregoing and other changes may be made without departing from the spirit and the scope of the invention as hereinafter claimed.

What is claimed is:

1. Apparatus for transmitting power obtained by converting the exhaust energy of a primary engine, the primary engine having a crank shaft and an exhaust passage for passing exhaust gas from the engine, the apparatus comprising:
   an output turbine having an output shaft and an intake port coupled to said exhaust passage;
   a compressor mounted on said output shaft of said turbine and including an outlet port;
   a rotary type engine having a double jointed trochoidal shaped rotor housing, said housing having an expansion chamber with an intake port and an outlet port and a compression chamber, the engine further comprising an eccentrically rotatable generally triangular shaped rotor mounted within the housing and a rotor shaft coupled to the rotor,
   said outlet port of said compressor being coupled to said intake port of said expansion chamber, said outlet port of said expansion chamber being coupled to said intake port of said output turbine; and
   power transmitting means connected between the crank shaft of the primary engine and the rotor shaft of the rotary engine whereby auxiliary power is provided to the primary engine.

2. Apparatus according to claim 1 wherein said compression chamber has an intake port and an outlet port, said intake port being coupled to the atmosphere and said oulet port being coupled to an intake port of said primary engine to assist the output of the primary engine.

* * * * *